UNITED STATES PATENT OFFICE.

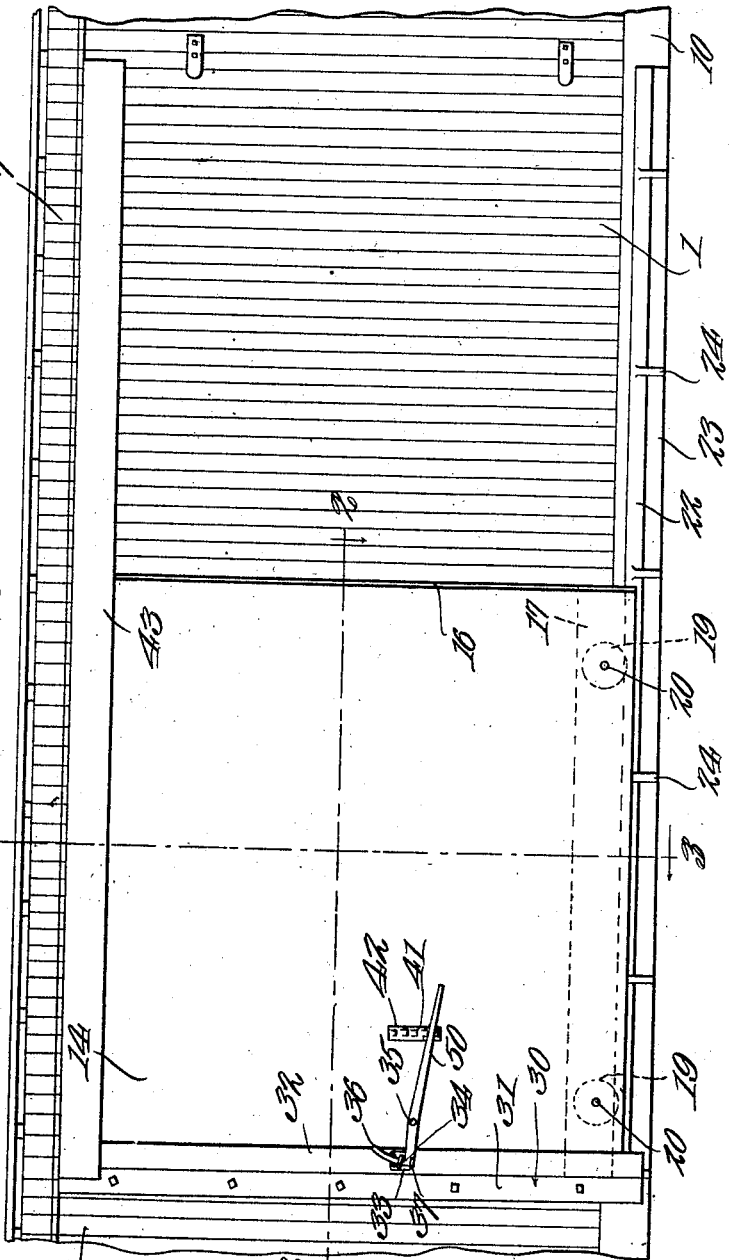

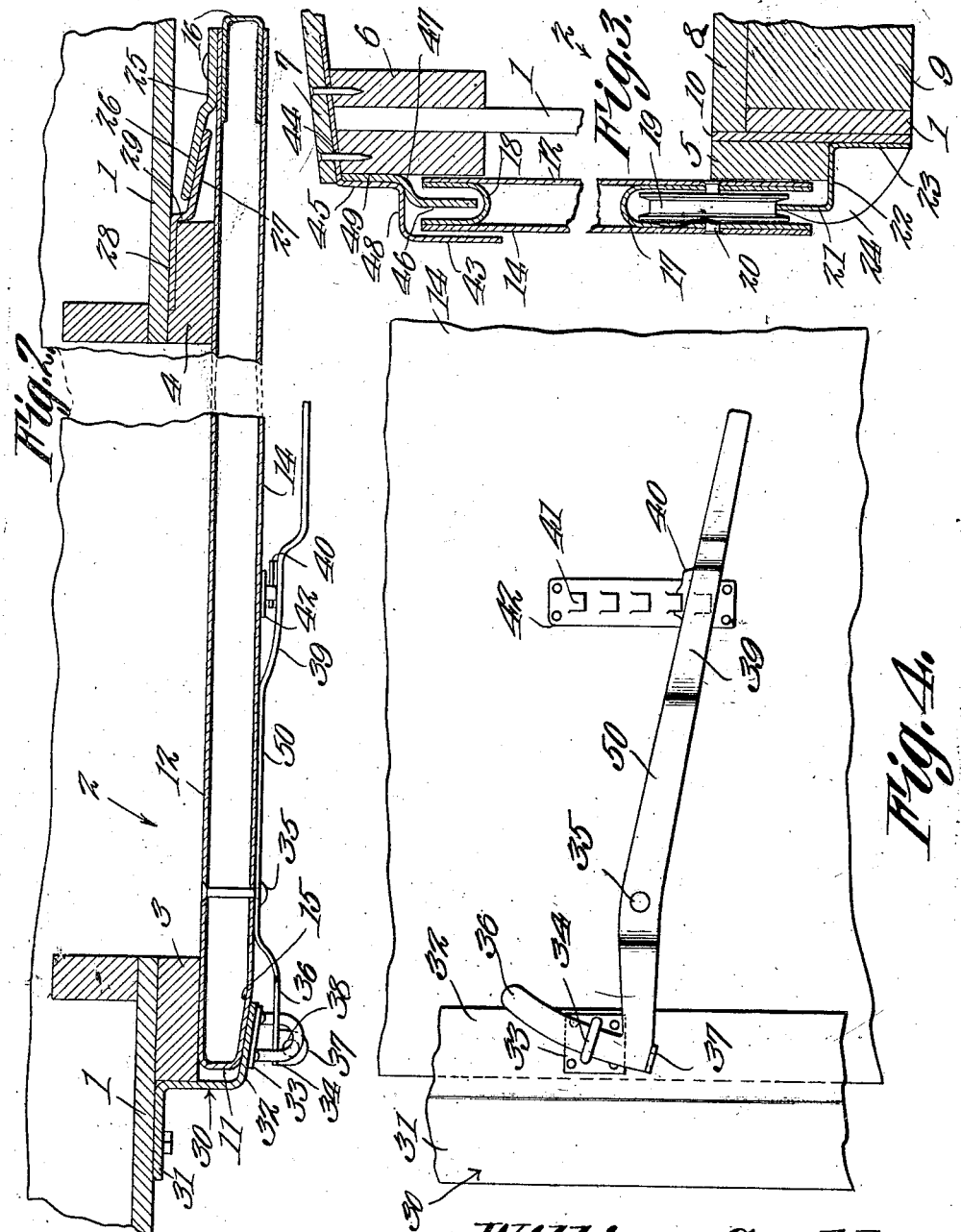

WILLIAM SNEDDON, OF DEL RIO, TEXAS.

CAR-DOOR.

1,152,665. Specification of Letters Patent. Patented Sept. 7, 1915.

Application filed October 19, 1914. Serial No. 867,445.

*To all whom it may concern:*

Be it known that I, WILLIAM SNEDDON, a citizen of the United States, residing at Del Rio, in the county of Valverde and State of Texas, have invented a new and useful Car-Door, of which the following is a specification.

This invention aims to provide a novel means for slidably mounting a car door.
With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.
In the accompanying drawings:—Figure 1 shows in side elevation, a car equipped with a door forming the subject matter of this application; Fig. 2 is a fragmental horizontal section on the line 2—2 of Fig. 1;
Fig. 3 is a transverse section on the line 3—3 of Fig. 1, parts being broken away; Fig. 4 is a detail enlarged from Fig. 1 and depicting the locking device upon an enlarged scale.
In the accompanying drawings there is shown a car comprising a side wall 1 having a doorway 2 defined by a front door post 3 and a rear door post 4. The sill of the door is shown at 5 and the lintel appears at 6.
The roof of the car is designated by the reference character 7 and the floor of the car is shown at 8. One of the floor timbers appears at 9. A metal plate 10 is interposed between the side wall 1 of the car, below the doorway 2 and the sill 5 as clearly shown in Fig. 3.

The door proper preferably is fashioned from a sheet of metal bent upon itself as shown at 11 to define one of the upright edges of the door, towit, the forward edge thereof. By the operation above described, the inner and outer wings 12 and 14 respectively of the door are formed. Adjacent its forward edge, the door is beveled or inclined as shown at 15, for a purpose to be described hereinafter, this bevel or inclination shown at 15 being fashioned in the outer wing 14 of the door. Interposed between the wings 12 and 14 at the rear edge of the door is an arched or U-shaped filler 16, the crown of which is outwardly disposed. Mounted between the wings 12 and 14 along the upper edge of the door is an arched or U-shaped filler 18 defining a trough-shaped recess in the upper edge of the door. An arched or U-shaped filler 17 is interposed between the wings 12 and 14 along the lower edge of the door and defines a trough-shaped recess in the lower edge of the door. Located within the U-shaped filler 18 at the lower edge of the door are anti-friction devices such as rollers 19, the axles 20 of which are journaled in the side portions of the filler 17 and in the wings 12 and 14 of the door. A car carried track coöperates with the rollers 19 and enters the U-shaped filler 17. This track is preferably in the form of a Z-bar 22, the depending flange 23 of which abuts against and is secured to the plate 10, the upstanding flange 21 of which engages in the tread of the rollers 19. Connecting the flanges 21 and 23 and spaced from each other are reinforcing webs or brackets 24. The coöperation between the track above described and the rollers 19 is such that the door may move transversely, to permit the door to be crowded up closely against the wall of the car, when the door is moved to a closed position.

Secured to the inner wing 12 adjacent the rear edge of the door is a strip 25 embodying an inclined flange 26 adapted to coöperate with an inclined flange 27 constituting a part of a plate or strip 28 inserted and held between the rear post 4 and the side wall 1 of the car as clearly shown in Fig. 2. Intermediate its upright edges, the plate 28 is provided with a shoulder 29 engaging the exposed, upright edge of the post 4 to aid in preventing the strip or plate 28 from being crowded to the left in Fig. 2 when the flange 27 is engaged by the flange 26 on the door carried strip 25. It will be obvious from Fig. 2 that when the door is moved to a closed position, the flanges 26 and 27 coact to draw the door transversely and to press the door against the posts 3 and 4 or against some other accessible portions of the wall of the car, depending upon the specific manner in which the car is built.

The invention further includes a keeper in the form of a Z-bar 30, one flange of which, indicated at 31 is secured to the side wall 1 of the car adjacent the front door post 3. One portion of the Z-bar 30 engages the upright edge of the post 3, as clearly shown in Fig. 2. The flange 32 of the keeper or Z-bar 30 is spaced from the post 3 and is inclined to coöperate with the beveled portion 15 of the door. When the door is moved to a closed position, the beveled portion 15 of the door will coact with the inclined flange 32 of the keeper 30 and crowd the door transversely against the car.

A plate 33 is bolted, riveted or otherwise secured to the flange 32 of the keeper 30 and carries an eye 34. Fulcrumed as shown at 35, intermediate its ends, upon the door is a lever 50 having an upstanding curved finger 36 which passes through the eye 34. At the angle defined by the finger 36 and the lever proper 50 there is formed an outstanding projection 37 having an opening 38, shown in Fig. 2. Through the opening 38 and through the eye 34 may be placed a car seal (not shown), when the parts of the locking device above described are in the locked positions shown in Figs. 4 and 2. The lever 50 is offset as shown at 39 near its free end to clear a ratchet plate 42 which is secured to the outer wing 14 of the door. The ratchet plate 42 is provided with teeth 41 adapted to be engaged by a lip 40 projecting from the lever 50. The lever 50 preferably is slightly resilient, to enable the lip 40 to coöperate properly with the teeth 41 on the ratchet plate 42. When the lip 40 is engaged with the ratchet teeth 41, the finger 36 on the lever will be held engaged with the eye 34 as clearly shown in Fig. 4.

Secured to the outer face of the lintel 6 is an outer guard 43 overhanging the outer face of the door adjacent the upper edge thereof. The outer guard 43 includes a flange 44 bound between the roof 7 and the lintel 6 and, if desired, the flange 44 may be perforated, as shown, to permit the passage of the nails whereby the roof 7 is held to the lintel 6. The outer guard 43 embodies an upright flange 45 and an outstanding flange 48.

An inner guard 46 is shown, and the lower edge of this guard projects downwardly into the trough-shaped recess defined in the upper edge of the door by the U-shaped filler 18. The upper flange 49 of the inner guard 46 is engaged between the portion 45 of the outer guard and the lintel 6. At the point of juncture between the upper and lower flanges of the inner guard 46, the same is flexed laterally to form a shoulder 47 engaging the outer guard at the angle defined by the parts 45 and 48 thereof.

It is to be noted, referring particularly to Fig. 2, that when the door is in closed position, the door is held against the outer face of the car by the coaction between the parts 15 and 32 upon the one hand and the parts 26 and 27 upon the other hand, these elements being located along the upright front and rear edges of the door. Therefore, should the cargo shift and press against the door, the outward pressure is taken care of by the parts above mentioned, and is not carried into the door supporting means.

When the right hand end of the lever 50 is elevated, to break the engagement between the finger 36 and the eye 34, a slight movement of the door to the right, referring to Fig. 2 is produced, owing to the fact that the curved finger 36 bears against the eye 34 during the operation above described. Therefore, when the car door is unlocked, the door at the same time is moved slightly to the right and the engagement between the parts 26 and 27 upon the one hand and 15 and 32 upon the other hand is broken.

Although the structure herein disclosed has been depicted as constituting a part of a wooden car, it will be obvious to those skilled in the art that the invention is applicable equally to cars of steel construction. The device is of use either upon a freight car or upon a stock car. The constituent material out of which the door is formed may be corrugated or otherwise shaped, these details lying well within the skill of a mechanic and requiring neither extended description nor specific illustration, since the utility and the patentability of the structure is not thereby affected.

The outer guard 43 which is located at the top of the door prevents rain or snow from beating in across the upper edge of the door. This result is promoted, further, by reason of the fact that the inner guard 46 extends downwardly into the trough-shaped recess defined in the upper edge of the door by the filler 18. The door, therefore, is substantially weatherproof, about its entire periphery, it being observed that the upright flange 21 on the lower track extends well into the recess defined in the lower edge of the door by the filler 17.

Notice should be taken of the fact that a patent maturing out of the present application will confer no rights as to the latch mechanism comprising the lever 50 and coöperating parts, this portion of the device constituting a separate and distinct invention forming the subject matter of a copending application Serial No. 20,014, filed on the 8th day of April, 1915.

Having thus described the invention, what is claimed is:—

In a device of the class described, a car having a doorway; a slidable door for the doorway; car carried means engaging the lower edge of the door to support the same for sliding movement; an inner guard secured to the car, the door having a recess in the upper edge, in which the inner guard is received; and an outer guard on the car, the outer guard overlapping the outer face of the door adjacent its upper edge.

In testimony that I claim the foregoing as my own, I have hereto affixed my signature in the presence of two witnesses.

WILLIAM SNEDDON.

Witnesses:
G. W. MENEFEE,
J. S. GETHING.